United States Patent [19]
Tillinghast et al.

[11] Patent Number: 6,078,145
[45] Date of Patent: Jun. 20, 2000

[54] SYNCHRONOUS TWO WIRE MULTIPLE STROBE AUTOTRIGGER CONTROL CIRCUIT

[75] Inventors: Sean P. Tillinghast, Bexley, Ohio; Robert J. Knauff, Chetek, Wis.

[73] Assignee: Weldon Technologies, Inc., Hilliard, Ohio

[21] Appl. No.: 08/987,268

[22] Filed: Dec. 9, 1997

Related U.S. Application Data

[60] Provisional application No. 60/033,295, Dec. 10, 1996.

[51] Int. Cl.[7] .................................................. H05B 41/34
[52] U.S. Cl. .............................. 315/241 S; 315/241 R; 315/200 A; 315/82
[58] Field of Search ........................... 315/241 S, 241 R, 315/241 P, 82, 77, 78, 200 A, 209 R, 224, 307; 307/10.8

[56] References Cited

U.S. PATENT DOCUMENTS

| | | | |
|---|---|---|---|
| 3,644,818 | 2/1972 | Paget | 315/241 S |
| 3,673,462 | 6/1972 | Girard | 315/200 A |
| 3,845,349 | 10/1974 | Liebman | 315/241 S |
| 4,013,921 | 3/1977 | Corthell | 315/241 P |
| 4,301,392 | 11/1981 | Hirata | 315/241 P |
| 4,317,070 | 2/1982 | Tokuda et al. | 315/241 P |
| 4,958,143 | 9/1990 | Knauff | 340/479 |
| 5,013,973 | 5/1991 | Stopa | 315/241 P |
| 5,386,180 | 1/1995 | Nakajima et al. | 315/241 S |

*Primary Examiner*—Haissa Philogene
*Assistant Examiner*—Wilson Lee
*Attorney, Agent, or Firm*—James R. Eley, Esq.; Kegler, Brown, Hill & Ritter

[57] ABSTRACT

An apparatus for simply retrofitting pre-existing vehicular incandescent hazard flashing lamps or strobe assemblies having high voltage wiring with low voltage, low-cost, two wire synchronized strobe lamp assemblies without requiring the altering of the vehicle's existing structure or wiring. The apparatus utilizes a high voltage d.c. to d.c. converter circuit which may be completely contained within the lamp housing so that no high voltage wiring will be routed through the vehicle. The strobe trigger circuit operates by sensing the ground potential at its input to trigger the strobe assembly's flash tube. This feature allows the synchronization of all circuit lamps, both incandescent and strobe, on a two wire flasher circuit without the need for a third wire to provide the trigger signal to the flash circuit. One embodiment of the invention works autosynchronously in conjunction with a standard electromechanical flasher relay as may be utilized in a typical vehicular warning light system.

7 Claims, 3 Drawing Sheets

SYNCHRONOUS TWO WIRE MULTIPLE STROBE AUTOTRIGGER CONTROL CIRCUIT

This invention claims the benefit of U.S. Provisional Application, Ser. No. 60/033,295, filed Dec. 10, 1996.

BACKGROUND OF THE INVENTION

The invention relates to a self-contained strobe light assembly primarily adapted to be used in connection with warning lights on a vehicle. Certain utility vehicles, such as service and delivery vehicles, utilize flashing lights in connection with the operation of providing those services. For example, a postal vehicle, when making deliveries, may activate flashing yellow hazard lights to alert approaching drivers to use caution when nearing the delivery vehicle. Heretofore, the majority of vehicle flashers on such commercial vehicles have been provided with incandescent lamps as the source of illumination. When it is desired to turn on the vehicle's hazard lights, e.g., in a delivery situation, the driver of the vehicle merely switches the flashing hazard lamp circuit "ON" from within the vehicle's cab. In operation of such a typical 12VDC vehicular warning lamp circuit, a 12VDC electromechanical flasher relay is activated and alternately provides 12VDC power to flash each hazard lamp simultaneously. A utility vehicle may have multiple hazard lamps mounted upon its exterior, generally, as a minimum, two in the rear and two in the front. In some applications, hazard lamps may also be located on the sides of the vehicles.

One major disadvantage of using incandescent lighting for flashing hazard lamps is their relatively poor visibility under certain ambient conditions, such as in heavy fog. It has been shown that flashing strobe lamps provide significantly greater visibility than flashing incandescent lamps under such adverse conditions. For this reason, recent efforts have been undertaken to replace existing flashing incandescent hazard lamps with strobe light assemblies. Such strobe lamps are currently available in the art as a replacement for the original equipment incandescent lamp assemblies. However, this prior art strobe lamp assembly is both expensive and time consuming to install and may require undesirable physical alterations to be made to the vehicle.

These prior art strobe assemblies require high voltage wiring, nominally 360VDC, be routed from a remotely mounted DC to DC converter located within the vehicle to the strobe lamp housing, typically located at the front and on the rear of the vehicle, in order to supply high voltage to the strobe tube located within each of the lamp housings. In addition to the high voltage supply wiring, the prior art flash assembly also requires a third high voltage wire to be installed to supply a nominal 250VDC synchronized trigger pulse to the trigger transformer, also located within the lamp housing. This arrangement also requires that a separate, continuous 12VDC-power circuit be installed in parallel with the flasher circuit to supply voltage to the remote strobe power supply. The presence of these high voltage lines in an otherwise 12VDC system is another disadvantage of employing the strobe lamp assembly found in the art. Finally, the prior art provided no means for synchronizing the strobe flashes with the flashing of complementary flashing incandescent lamps.

There is a need for a synchronized strobe lamp assembly that is easily retrofitted in place of existing lamp housings, and that does not require high voltage wiring to be routed through a vehicle to the strobe assembly.

SUMMARY OF THE INVENTION

The present invention overcomes each of these disadvantages by providing a device that is retrofitted into pre-existing incandescent hazard flashing lamps or strobe assemblies that have high voltage wiring with low voltage, low-cost, two wire synchronized strobe lamp assemblies, which is done without altering any of the vehicle's existing structure or wiring. Furthermore, the invention utilizes a converter circuit, which may be completely contained within a lamp housing so that no high voltage wiring is present anywhere in the vehicle.

One aspect of the invention utilizes a circuit that senses ground potential at an input node to trigger the assembly's strobe lamp. It is this feature that allows the synchronization of all lamps in a circuit, both incandescent and strobe, on a two-wire flasher circuit. The DC to DC converter side of the circuit, shown generally as the left half portion of FIG. 1 within a dashed rectangle, is similar to other flash charging circuits present in the art, such as that shown in U.S. Pat. No. 4,958,143, issued to Knauff and entitled "Synchronized Pulse-Enhanced Dual Light Source", the teachings of which are hereby incorporated by reference. Similarities include the use of the flyback transformer and a similar method for charging the flash capacitor, shown in FIG. 1 as capacitor C5. However, unlike that of the prior art, the trigger circuit of the present invention does not require a third, external signal wire to trigger the strobe flash. This circuit of the present invention is unique in its simplicity in that it allows the strobe to function in a two wire circuit without the need for a third wire to provide the trigger signal to the flash circuit. Rather than use a third wire to provide a trigger signal to the flash circuit, the present invention works autosynchronously in conjunction with a standard electro-mechanical flasher relay as may be found in vehicular warning light systems.

Another aspect of the invention is to provide a strobe lamp assembly having a housing with a base and an opening opposite the base, a light-transmitting lens covering the opening of the housing, and a power supply attached to the housing. The power supply has an input connected to a DC voltage cycled between an activated and unactivated state. The output of the power supply charges a flash capacitor when the voltage source is in the activated state. A gas-filled strobe tube is located within the housing and is electrically connected to the flash capacitor and a control circuit. The control circuit triggers the flash tube by ionizing the gas therein, where the control circuit is responsive to a change in the DC voltage input to trigger discharge of the charged flash capacitor through the ionized flash tube.

Yet another aspect of the invention is to provide a synchronized warning lamp system, made up of at least two strobe lamp assemblies each having a housing with a base and an opening opposite the base and a light-transmitting cover fitted within the opening of the housing. A power supply is attached to the housing and has an input connected to a DC voltage source, which is cycled between an activated and unactivated state, and an output that charges a flash capacitor when the voltage source is in the activated state. A gas-filled strobe tube is provided within the housing and is electrically connected to the flash capacitor and a control circuit within the housing. The control circuit triggers the flash tube by ionizing the gas therein, wherein the control circuit is responsive to a change in the DC voltage input to trigger discharge of the charged flash capacitor through the ionized flash tube. Each of the strobe assemblies is electrically connected in parallel to a common DC voltage source.

Another aspect of the invention is to provide a strobe lamp assembly wherein power and control of the strobe lamp assembly is provided by no more than two wires.

Yet another aspect of the invention is to provide a synchronized warning lamp system having both strobe and incandescent lamp assemblies, where each of the lamp assemblies is connected in parallel to one another and to a common DC voltage source.

Another aspect of the invention is to provide a synchronized warning lamp system having both strobe and incandescent lamp assemblies, where each of the lamp assemblies is connected in parallel to one another and to a common DC voltage source, and where there is alternating activation of the incandescent and strobe lamps.

Other objects and advantages of the invention will become apparent upon reading the following detailed description and upon reference to the included drawings.

DETAILED DESCRIPTION OF THE INVENTION

Figure 1A:
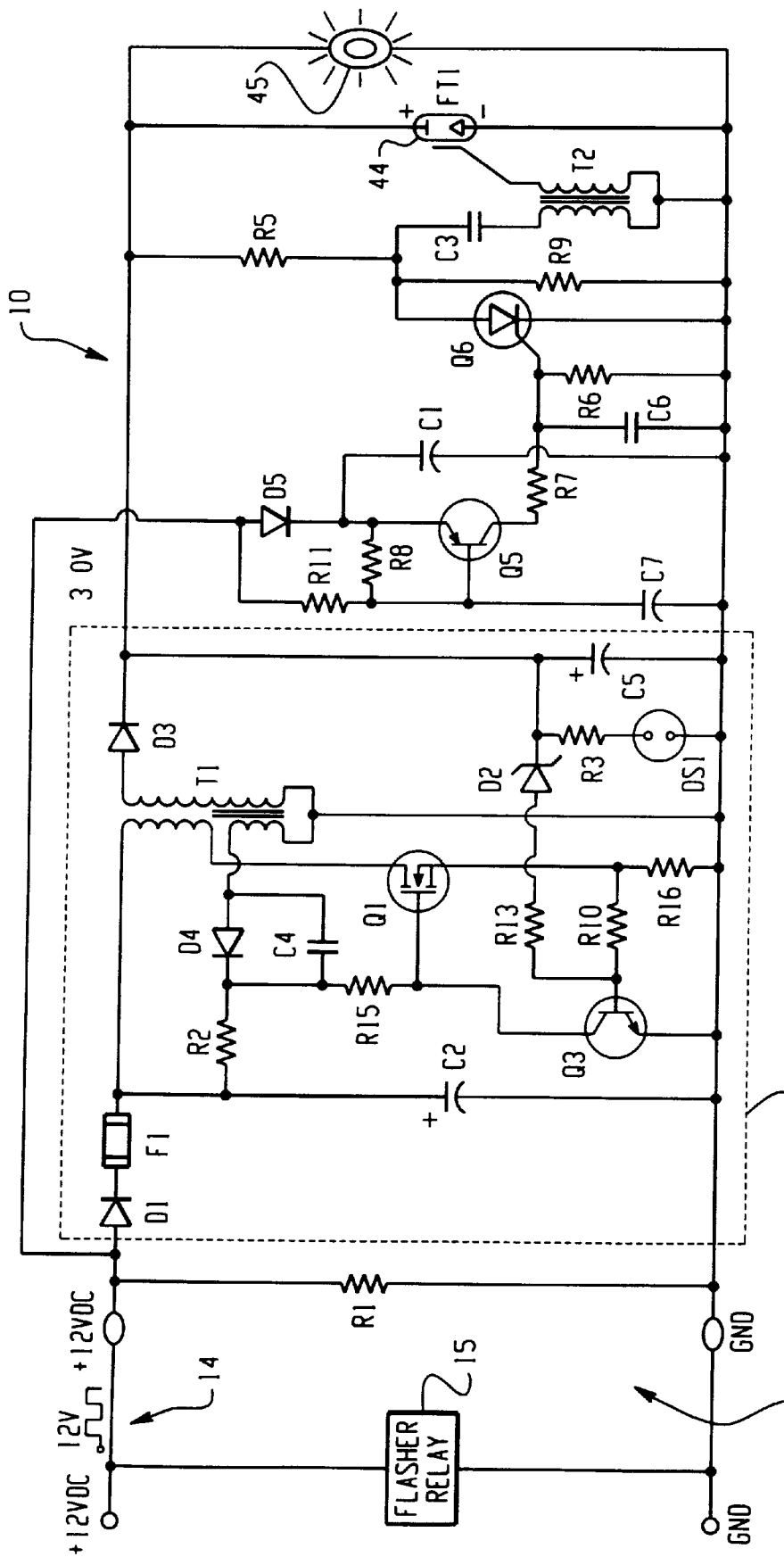
FIG. 1A is a circuit schematic according to a first embodiment of the present invention.
Figure 1B:
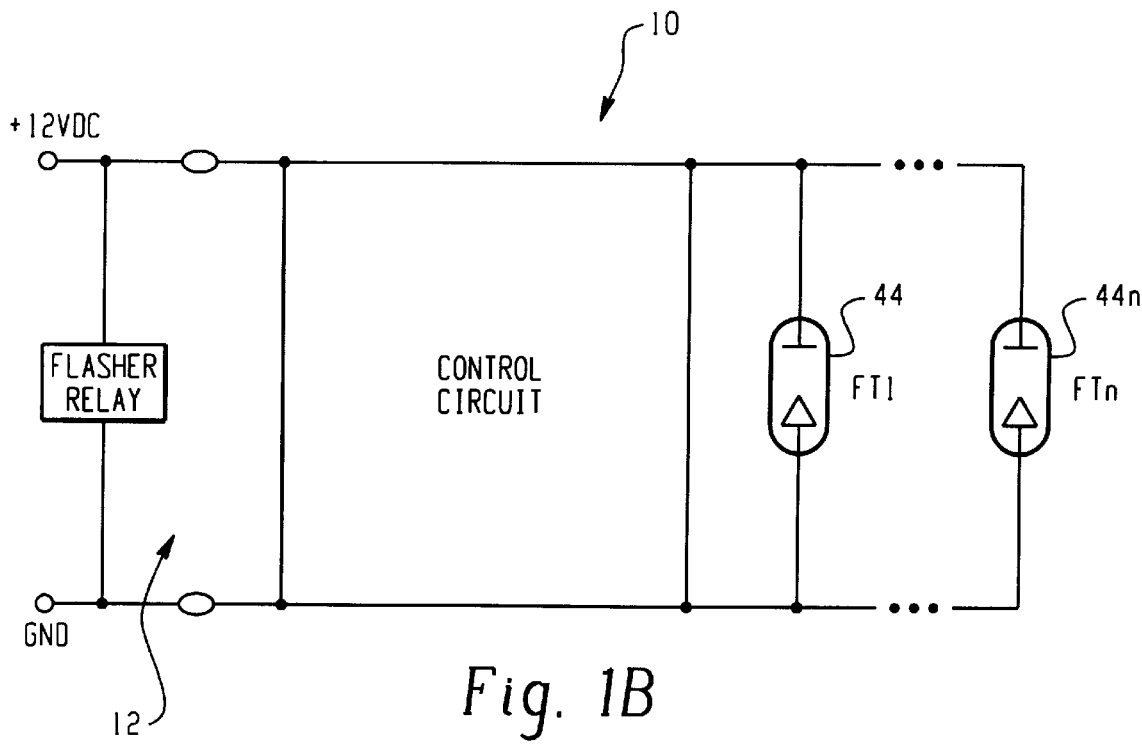
FIG. 1B is a circuit schematic according to a second embodiment of the present invention.
Figure 2:
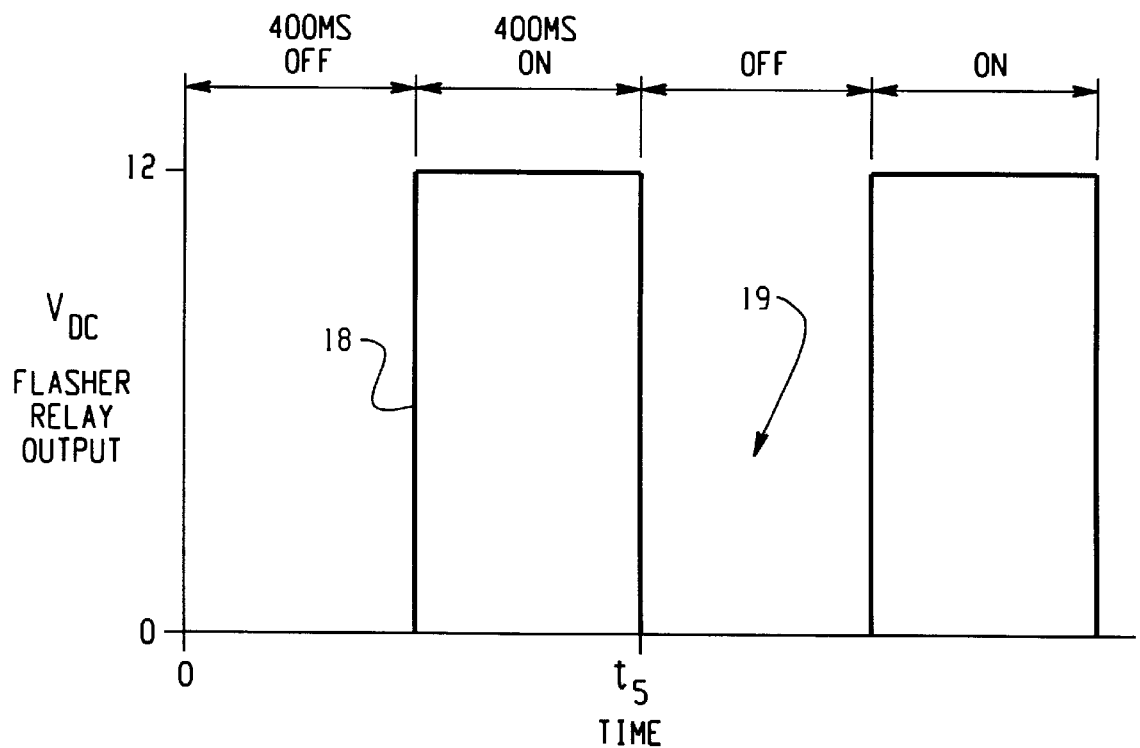
FIG. 2 is a waveform of a DC voltage (VDC) output from an automotive 12VDC flasher relay according to the present invention.

Referring to FIG. 1A, a first embodiment of the present invention is shown with an input section 12 of an autotrigger strobe circuit 10 connected to a 12VDC output 14 of a flasher relay 15, preferably similar to one that may be found in a vehicular warning lamp circuit. Referring to FIG. 2, the flasher relay 15 typically utilizes roughly a 50% duty cycle, that is, it is "ON", or activated, 50% of the time, as shown at 18, and "OFF", or deactivated, 50% of the time, typically 400 milliseconds, as shown at 19, depending upon the flasher type and the number of lamps in the circuit. As is shown, this 12VDC signal 14 is periodically provided to the input 12 of the autotrigger circuit 10 as the flasher relay 15 cycles "ON" and "OFF". During the "ON" pulse of the flasher 15, 12VDC is provided to a section of the strobe circuit 10 that includes a DC to DC converter 16, which is shown in FIG. 1 outlined with dashed lines. This DC to DC converter 16 is a high voltage power supply for the strobe circuit 10, and preferably provides a nominal 330 VDC output given a 12 VDC input.

Figure 3:
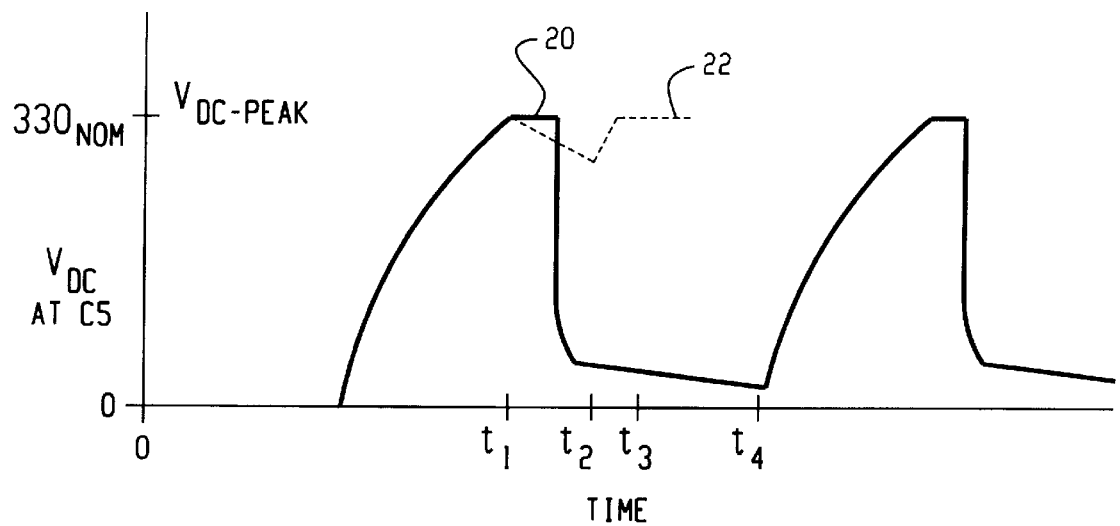
FIG. 3 is the waveform of the DC voltage (VDC) charge across capacitor C5 in accordance with the first embodiment of the present invention.

Referring now to FIG. 3, when 12VDC is supplied to the input 12 of the strobe circuit 10, the converter 16 is enabled and charges flash capacitor C5 to the output voltage of transformer T1, which preferably is a nominal 330VDC, and is controlled by the value of zener diode D2. The charge on capacitor C5 is depicted by the waveform 20. As circuit current ramps up through the primary winding of transformer T1, an initial voltage across resistors R2 and R14 turns on the gate of MOSFET Q1 allowing current to flow down source resistor R16 and through the primary of transformer T1. As the current through the primary winding reaches saturation, feedback current is provided through the feedback winding of transformer T1, which shuts off the flow of current through transformer T1 by controlling the conductivity of MOSFET Q1. This sets up the oscillation of MOSFET Q1, which, in turn, causes the flyback output from the secondary of transformer T1. The output of transformer T1 is rectified using diode D3 to provide only positive DC voltages across capacitor C5, which charges up to a voltage value determined by zener diode D2, preferably about 330VDC. This is represented as the curve of waveform 20 between times $t_0$–$t_1$ in FIG. 3. When capacitor C5 reaches the desired charge voltage as set by zener diode D2, current is supplied to the base of NPN transistor Q3 via D2 and limited by R13, which pulls the base of the FET Q1 to ground thus shutting down the converter 16 and preventing the capacitor C5 from overcharging. Similarly, peak currents are limited through the primary winding of transformer T1 by sensing the voltage rise across source resistor R16. The values of the source resistor R6 and resistor R10 set the current at which transistor Q3 is enabled and the converter 16 is shut down.

On the "OFF" portion of the cycle 14 of the flasher relay 15, i.e., when the input power to the strobe circuit 10 is opened by the flasher relay 15, the silicon controlled rectifier (SCR) Q6 turns "ON" inducing a high voltage on the secondary winding of trigger transformer T2. This high voltage ionizes the gas-filled strobe tube FT1 44, or in a second embodiment a plurality of strobe tubes FTN 44$n$ as shown in FIG. 1B, providing a discharge path for capacitor C5 thus producing a flash of light from the tube FT1.

The voltage stored by capacitor C5 is shown by waveform 20 in FIG. 3. Referring to this Figure, it is seen that the VDC stored by capacitor C5 ramps up to a predetermined peak level (VDC-peak), at time $t_1$, at which point zener diode D2 breaks over, causing transistor Q3 to conduct, thus shutting off MOSFET Q1. When MOSFET Q1 is "OFF", transformer T1 is disabled and no current flows through its secondary windings. Should VDC-peak fall below a desired voltage level, as shown by dashed line 22 at time $t_2$, zener diode D2 ceases to conduct current and allows VDC at capacitor C5 to once again reach VDC-peak at time $t_3$. Preferably, VDC-peak is a nominal 330 volts.

To reduce the current draw of the circuit 10, VDC at capacitor C5 should not remain at VDC-peak for very long before being discharged by the flasher output returning to ground at time $t_5$. Comparing the waveforms of FIGS. 2 and 3, which are depicted along the same time line, it can be seen that VDC at capacitor C5 discharges at time $t_5$ as the flasher output goes from 12VDC to 0VDC. Beginning with the "OFF" cycle 19 of flasher pulse (at time $t_5$), the ground pulse activates PNP-type transistor Q5, which acts as a switch to allow the voltage provided by charged capacitor C1 to trigger SCR Q6. Diode D5 is provided to prevent capacitor C1 from discharging when the output voltage of the flasher 15 goes to ground via resistor R1, or other parallel circuit resistance such as an incandescent lamp 45, which is shown as being optionally in the circuit 10. Resistor R8 provides reverse bias to ensure that transistor Q5 remains off should voltage fluctuations appear in the circuit 10. Resistor R11 provides reverse bias voltage to transistor Q5 when the output voltage of flasher 15 is positive and, alternately, a negative trigger bias voltage when the output voltage of flasher 15 goes to ground. Connected between resistor R11 and circuit ground, capacitor C7 is provided to filter a contact bounce of the flasher relay 15, and prevent the false triggering of transistor Q5 in the presence of a negative going voltage. When SCR Q6 is turned on, VDC stored by capacitor C3 is discharged, which causes transformer T2 to provide a high voltage (typically 4 kVDC) around the glass envelope of strobe tube FT1. Voltage stored by capacitor C3 is determined by the voltage divider circuit formed by resistors R5 and R9. The presence of a high voltage from the secondary of transformer T2 causes the xenon gas in the strobe tube FT1 to ionize, which allows the capacitor C5 to discharge its stored voltage across the anode and cathode of the strobe tube FT1. This sequence is repeated for as long as the input voltage alternates between high, typically 12VDC and ground (0VDC).

Referring once again to FIG. 3, note that VDC at capacitor C5 does not fully discharge to 0VDC when the strobe tube FT1 is triggered at time $t_5$. This is due to the sustaining voltage of the strobe tube FT1, typically 60VDC. Rather, the remaining voltage at capacitor C5 is dissipated, between times $t_5$ and $t_4$, by resistors R3, R5 and R9.

Capacitor C6 is provided between the gate of SCR Q6 and circuit ground to filter out false triggers to the gate of SCR Q6. Resistor R7 is connected between the collector of transistor Q5 and the gate of SCR Q6 to limit the current to the gate of the SCR Q6. Resistor R6 is connected between the gate of SCR Q6 and circuit ground to provide reverse bias voltage at the gate of SCR Q6. In this regard, the sensitivity of the gate of SCR Q6 is diminished to prevent its false triggering.

Figure 4:
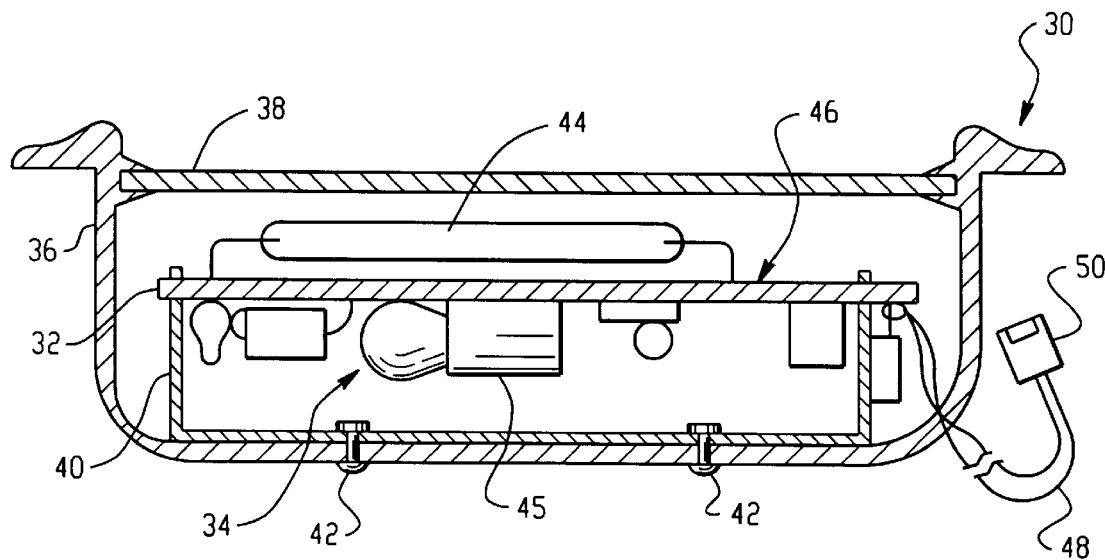
FIG. 4 is a sectional view of strobe light assembly according to the first embodiment of the present invention.

A detailed view of a strobe assembly 30 according to the first embodiment of the present invention is shown in FIG. 4. As can be seen, a printed circuit board 32 having circuit components 34, preferably those that are disclosed in FIG. 1, is mounted within a flexible lamp housing 36 having a lens 38, which is preferably a commercially available one manufactured by Signal Stat. This lamp housing 36 is designed to be mounted within a cavity, preferably one within the body of a vehicle.

The printed circuit board 32 is shown to be held in place by a combination board mounting bracket/heat sink 40, which is preferably secured to the body of the housing 36 by rivets or other suitable fastening means. Flash tube 44 (FT1 in FIG. 1) is shown to be mounted on the side of the circuit board 32 facing the opening of the housing 36, thus permitting the emitted strobe flash to be directed through a light-transmitting cover 38, which is preferably a refractive type lens and/or color filter. Also, the incandescent lamp 45 is mounted on an opposite side of the circuit board 32 as the flash tube 44. The upper surface 46 of circuit board 32 may be substantially coated with a reflective material to enhance the amount of light that is directed through the lens 38. The placement of the strobe tube 44 on the opposite side of the circuit board 32 from the circuit components 34 and lamp 45 also has the advantage of keeping the infrared energy, in the form of heat, generated during the pulse of the strobe tube 44, from directly bombarding the circuit components.

The circuit board 32 is powered via two wires 48, which are preferably terminated by a molded connector 50. Preferably, the connector 50 is of a same type as supplied with a standard incandescent assembly, which is being replaced by strobe assembly 30. In this manner, the housing 36 containing the componentry of the present invention shares 100% physical compatibility with the assembly that it is replacing, thus making the retrofit of existing lamp assemblies with those employing the invention as simple and inexpensive as possible.

The circuit 10 permits any number of strobe lamps 44 to be connected in a vehicle and be both powered and synchronized through a single pair of wires 48 by connection to the output of a common automotive flasher relay 15. Of course, it must be appreciated that the circuit 10 could be configured to operate using the vehicle or system ground as the circuit ground, thereby eliminating the second ground wire. It is also to be appreciated that in alternative embodiments a number of incandescent lamps connected in parallel can be powered up during the "ON" portion of the flasher duty cycle. In operation, this would appear as flashing strobes alternating with flashing incandescent lamps.

Accordingly, it is apparent from the foregoing detailed description and illustrative drawings that a readily installable strobe control circuit has been invented which satisfies the objectives and achieves the advantages stated throughout this specification. While the invention is susceptible to various modifications and alternative forms, specific embodiments thereof have been shown by way of example in the drawings and have herein been described in detail. It should be understood, however, that it is not intended to limit the invention to the particular forms disclosed, but, on the contrary, the intention is to cover all modifications, equivalents, and alternatives falling within the spirit and scope of the invention as described by the appended claims.

We claim:

1. A system comprising:
    a DC power source configured to have first and second states;
    a strobe light assembly configured to be powered by the DC power source;
    a strobe light coupled to the strobe light assembly;
    two wires coupled to the strobe light assembly and configured to operatively couple the strobe light assembly to the DC power source; and
    a control circuit configured to charge the strobe light assembly based on the DC power source being in one of the first and second states and configured to discharge the strobe light assembly so that the strobe light flashes when the DC power source is in another one of the first and second states.

2. A system according to claim 1 further comprising first and second of said strobe light wherein the first and second of said strobe light are connected in parallel to the DC power source.

3. A system according to claim 1 wherein the first and second states are an activated and an inactivated state, respectively, of the DC power source.

4. A system according to claim 3 wherein said one of the first and second states is the inactivated state.

5. A system according to claim 3 further comprising a flasher relay configured to operate as the DC power source and to generate an output, wherein the state of the DC power source is based on the output.

6. A system according to claim 1 further comprising an incandescent lamp connected in parallel with the DC power source.

7. A system according to claim 6 wherein the incandescent lamp is triggered during another one of the first and second states.

* * * * *